Aug. 12, 1969 J. C. DE RIVAZ 3,461,450
DAMPED OSCILLATION ANALOG-TO-DIGITAL ENCODER
Filed Aug. 4, 1965
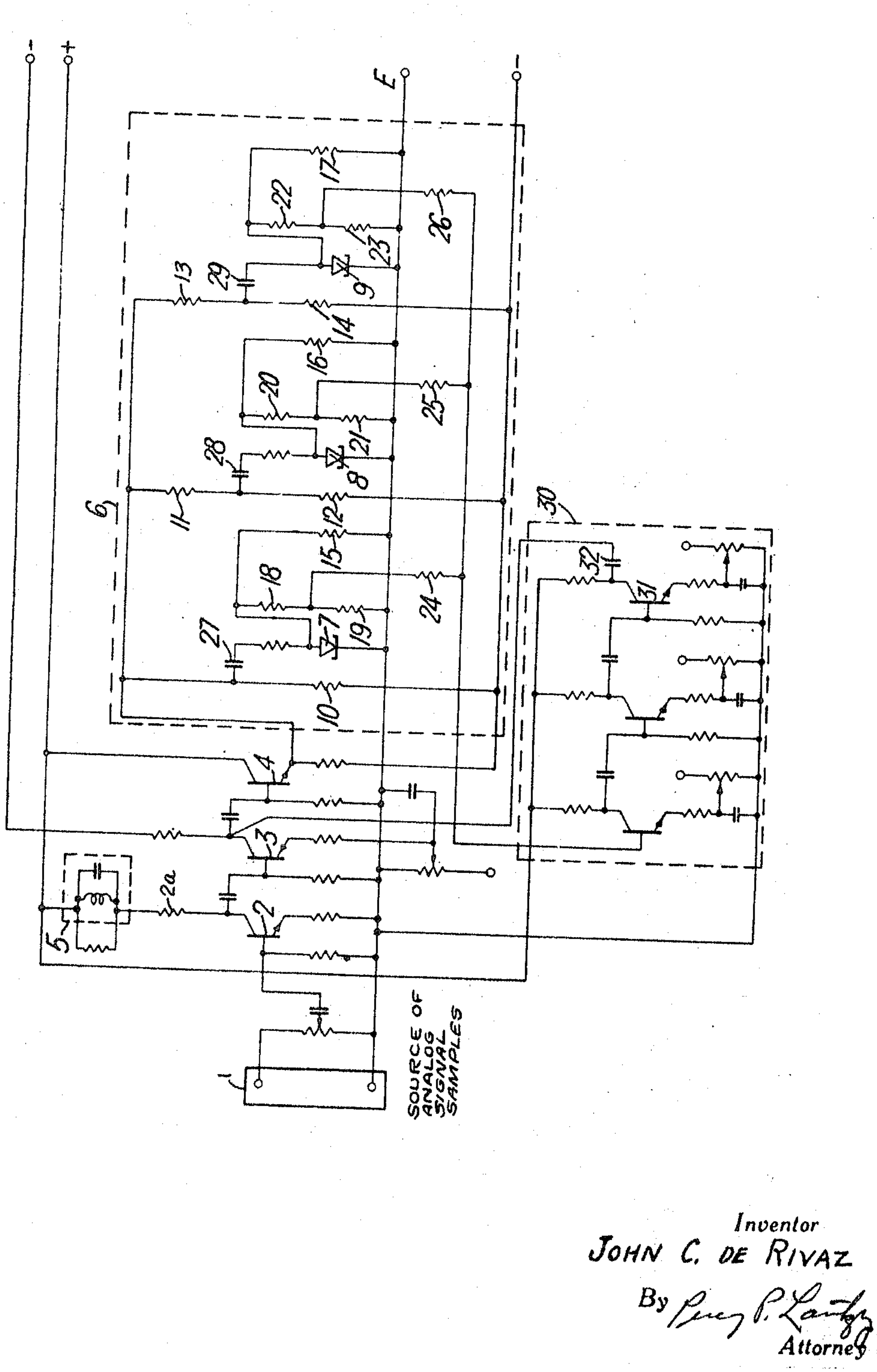
Inventor
JOHN C. DE RIVAZ
By [signature]
Attorney 3,461,450

DAMPED OSCILLATION ANALOG-TO-DIGITAL ENCODER

John Chevalley de Rivaz, London, England, assignor to International Standard Electric Corporation, New York, N.Y., a corporation of Delaware Filed Aug. 4, 1965, Ser. No. 477,119
Claims priority, application Great Britain, Aug. 21, 1964, 34,261/64
Int. Cl. H04l 3/00; H03k 13/02
U.S. Cl. 340—347 10 Claims

ABSTRACT OF THE DISCLOSURE

An equilibrium type encoder in which the step function of an analog signal having superimposed thereon a damped oscillation of initial amplitude proportional to the amplitude of the analog signal and decaying at a predetermined fixed rate is coupled in paralled to a plurality of tunnel diodes, each of which is biased to a different predetermined value related to the quantized levels of the encoder. Each diode changes from one stable condition to the other stable condition when the associated predetermined value is exceeded and will reverse this change when feedback reduces the analog input below the associated predetermined value. All the diodes are coupled to the input of a negative feedback circuit whose output is connected in parallel with the analog signal input to reduce the analog input to the diodes. The amount of feedback contributed by each diode is proportional to the digital weight of the diode.

This invention relates to analog-to-digital information converters, such as coding equipments used in pulse code modulation systems of communication (hereinafter referred to as P.C.M. systems).

In P.C.M. systems an analog input signal is quantized into one of $k$ levels each of which is represented by a code combination in an $n$-digit code. The code combination is then transmitted over the communication channel and decoded in the receiver to recreate the analog signal. Where the analog input is a varying waveform, such as a speech waveform, it is sampled at frequent intervals, and the instantaneous value of the input at the moment of sampling is coded. Also, if a sufficiently high rate of sampling and coding is achieved, multiplexing of two or more sets of signals on a single communication channel becomes possible.

The term "multistable device" as used hereinafter means a device having two or more stable conditions.

In one form of analog-to-digital converter there is provided a system of intercoupled multistable devices to each of which is imparted a different switching characteristic, and to which an analog quantity to be converted to its digital equivalent can be applied. The application of said analog quantity tends to set said multistable devices to any one of a number of conditions. An input is provided to apply a damped oscillatory condition or waveform to said multistable devices. The oscillatory waveform has an initial amplitude proportional to the amplitude of the analog signal amplitude and decays at a fixed predetermined rate. The arrangement is such that when said oscillatory waveform ends the conditions to which said multistable devices have been set as a result of an analog quantity applied thereto at the same time as said oscillatory waveform represent a digital code combination corresponding to said analog quantity. Such a converter is described and illustrated in the copending application of A. H. Reeves, Ser. No. 366,778, filed May 12, 1964, now U.S. Patent No. 3,320,605. Conveniently the converter digital output is in the form of a binary code, and the multistable devices are provided by tunnel diodes. Each device includes a tunnel diode in series with a resistance and a source of potential. In order to provide a binary code, the devices must have different digital values or "weights," and this can be achieved by applying the analog input in the form of a pulse sample, together with the damped oscillation, to the tunnel diodes by means of transformers. Each transformer has an input/output ratio corresponding to the digital weight assigned to its associated tunnel diode. The binary condition of the diodes are read out as the code combination of the analog signal amplitude.

According to the invention there is provided an analog-to-digital converter in which a combination of a step function or pulse sample of the analog input and a damped oscillatory waveform as above specified for the converter of the above cited copending application is impressed on a plurality of multistable devices each of which is biased so as to change from one stable condition to another stable condition when the input level exceeds a predetermined value, said predetermined value being different for all the multistable devices. All the multistable devices are coupled to the input of a negative feedback circuit the output of which is connected in parallel with the input to the multistable devices upon which is impressed the combined step function and damped oscillation. The amount of feedback contributed by each multistable device is proportional to the digital weight of the device.

A preferred embodiment of the invention will now be described with reference to the accompanying drawing which is a circuit diagram for a 3-digit P.C.M. coder.

In the circuit shown the analog signal sample or pulse is coupled from source 1 to the input waveform circuit which is provided by the transistors 2, 3 and 4 together with their associated circuitry. The analog signal has superimposed on it a damped oscillation as above specified generated by the tuned circuit 5. The coder unit 6 comprises three tunnel diodes 7, 8 and 9 in parallel. The amplitude at which each diode is triggered is determined by the resistors 10, 11 and 12, 13 and 14. The values of these resistors are chosen so that the voltages required to switch each diode on are in the ratio 1:2:4. The "voltage" required to switch them off is determined mainly by the resistors 15, 16 and 17. The ratio between the switch off voltages is governed by the negative resistance characteristics of the tunnel diodes, the amount of self-bias available from the capacitors 27, 28, 29 and the load line slope. The latter depends on the resistance in series with the tunnel diode. The negative feedback voltage available to switch off other diodes is determined mainly by resistors 18 and 19, 20 and 21, 22 and 23 and should be approximately proportional to the input ratios. However, account must be taken of the other resistances in series or parallel with the resistors 18 to 23 and the gain factor of the amplifier 30. The digital output from the tunnel diodes, determined by the binary condition of the tunnel diodes, are decoupled by the resistors 24, 25 and 26. The capacitors 27, 28 and 29 serve both to isolate the digital outputs from the bias of the emitter follower 4 and to bias the tunnel diodes. It will be appreciated that the input will charge the capacitors to provide the necessary bias potential.

As each tunnel diode is triggered, a portion of the voltage obtained by the resistors 18 and 19, 20 and 21, 22 and 23 is fed into the amplifier 30 by the decoupling resistors 24, 25 and 26. The amplifier is of conventional linear design with, in this example, a voltage gain of 40. The voltage for each tunnel diode as it is triggered is fed from the collector of transistor 31 to the collector of transistor 3 via the capacitor 32. This results in the input waveform at the emitter of transistor 4 dropping in voltage as the tunnel diode is triggered. Hence, the larger the "weight" of the tunnel diode the more the input voltage drops as it triggers. Therefore, as the intermediate significant "weight" tunnel diode triggers it will switch off the least significant "weight" tunnel diode, and as the most significant "weight" tunnel diode triggers it will switch off the intermediate and least significant "weight" tunnel diode.

The operation of the coder will now be described when an analog input of level 7 is applied. When "level" is referred to herein, it means "quantized level" or equally displaced amplitude levels at which an analog-to-digital converter generates a code combination. The input analog signal sample or step function is applied to the base of transistor 2 which conducts and shock excites the tuned resonant circuit 5. This generates a damped oscillatory waveform as above specified which is combined with the D.C. step function of the analog input in the collector circuit of transistor 2. This combined analog signal is applied to the base of transistor 3. The ratio of the step function to the oscillatory waveform is controlled by a resistance in the form of resistor 2*a* inserted in the collector circuit of transistor 2. Transistor 3 will conduct and acts as an amplifier for the combined input analog signal. The output of transistor 3 is fed to the base of the emitter follower transistor 4. The emitter follower output is applied via the capacitors 27, 28 and 29 to the three coding elements or tunnel diodes 7, 8 and 9. In the case under consideration the applied input increases to a peak value corresponding to the combined values of a step function, at level 7, and the first half cycle of the superimposed damped oscillation. This, it will be appreciated, is not an instantaneous rise but a rise having a finite time duration. Initially, the input will be at zero level, so nothing will happen. The step function is zero and since the step function is used to excite the tuned circuit the latter will remain unexcited. As the input transient rises and the tuned circuit gets driven towards its first peak the waveform applied to the coding elements or tunnel diodes also increases. From zero it passes through an amplitude value corresponding to level 1. As this level is reached diode 7, which is controlled by resistor 10 to switch on at level 1, will switch on. When diode 7 switches on a small feedback voltage pulse is derived via the potential divider network 18, 19 and is fed via resistor 24 to the amplifier 30. The amplified feedback pulse is then passed via the capacitor 32 to combine with the original combined analog input signal in the collector of transistor 3. Due to the phase reversing nature of the emitter follower transistor 4 the amplified feedback pulse is subtracted from the original combined analog input voltage. But since, as stated above, the initial feedback voltage derived from the least significant diode 7 is small, indeed so small as to be almost negligible, the effect of the amplified feedback pulse on the input signal is negligible. In any case, since diode 7 is the first and only diode switched on at this level, and since the purpose of the feedback circuit is to switch off a diode previously turned on, nothing happens as a result of the first diode providing a small feedback voltage. It may be remarked that in theory the coder ought to work without feedback from the first diode, but in practice it is found necessary to provide this small feedback to make adjustment of the complete circuit easier.

The input signal level continues to rise, and as it reaches level 2 it switches diode 8 on. The level at which diode 8 switches on is determined by the resistors 11 and 12 acting as a potential divider. The amount of feedback voltage derived when diode 8 is switched on is controlled by the potential divider network 20, 21 and is fed to the amplifier 30 via resistor 25. This feedback voltage pulse when amplified and combined with the collector output of transistor 3 is sufficient to reduce the applied analog voltage enough to switch off diode 7. It might be thought at first sight that the feedback effect would also switch off diode 8, but in fact the negative resistance characteristic of the tunnel diode imparts a certain amount of what may be termed "backlash" and this is sufficient to maintain diode 8 in the "on" condition, at least until the input level has risen sufficiently to compensate for the feedback from diode 8. Diode 7, being sensitive to smaller switching voltages, will however, be sensitive enough to be affected by the feedback pulse from diode 8.

The input continues to rise and passes level 3. The applied analog voltage is not sufficient to switch on diode 9, but is sufficient to switch on diodes 7 and 8. Diode 8 is already switched on and diode 7 is now switched on for the second time. As the analog input rises through level 4 diode 9 is switched on. The level at which diode 9 switches on is determined by resistors 13 and 14 acting as a potential divider. Diode 9 provides sufficient feedback via the potential dividing network 22, 23 and the resistor 26 to switch off diodes 7 and 8. Again, sufficient backlash is provided by the negative resistance characteristic of diode 9 to prevent this element from turning itself off. The analog input is meantime rising through level 5, when diode 7 is again switched on and through level 6 when diode 8 is again switched on and diode 7 is turned off by the feedback pulse from diode 8. Finally, the analog input passes level 7, when diode 7 is again switched on. Since the input passed level 4 diode 9 has remained switched on continuously.

The analog input now reaches a peak exceeding level 7, and the peak value is made up of the combination of the step function of level 7 and the first half cycle of the superimposed damped oscillation. The input will now fall during the third quarter cycle until its value is equivalent to the step function only. Since this corresponds to level 7 there is no effect on any of the diodes 7, 8, and 9 which all remain switched on. In point of fact there is no need to proceed further with the damped oscillating since the amplitude of the analog signal from source 1 is now properly coded, but in some cases it is desirable to continue with the damped oscillation, as described in the above cited copending application. As the input falls below level 7 first diode 7 will switch off, and then diode 8. When diode 8 switches off an inverted feedback voltage pulse will be generated to switch diode 7 on again. So it will be seen that as the input falls to its lowest peak at the end of the first complete cycle of the damped oscillation the coding process is reversed. However, the lowest peak will not be low enuogh to affect diode 9. Assuming the damped oscillation is such that on the first half cycle the input reaches a level $l\ (1+\frac{1}{2})$, on the second half cycle it drops to $l\ (1-\frac{1}{4})$, on the third half cycle it reaches $1\ (1+\frac{1}{8})$ and so on, where $l$ equals the level of the step function. Thus, on the second half cycle in the present example it will not fall below level 5. So at the end of the second half cycle diodes 9 and 7 will remain on. On the next half cycle the input will again rise above level 7 and all three diodes will be on. On the fourth half cycle the input will not fall below $l\ (1-\frac{1}{16})$. The circuit is arranged so that there is sufficient backlash to ensure that this latter drop below level 7 will not switch off diode 7. Further oscillation can be ignored and the net result is that all the diodes remain turned on and are maintained on by the continuing step function corresponding to level 7.

The foregoing has described the operation of the analog-to-digital converter of this invention when the amplitude of the analog signal is equal to level 7, the maximum quantized level or amplitude range of the converter. If the analog signal is equal to a lower level, the same operation will take place as described above up to that level, with the operation of the diodes for higher levels having no meaning since the bias for the associated diodes will not be exceeded. Taking this into account, the converter would generate the proper digital code combination, the binary conditions of the diodes, for any particular analog signal amplitude in the converter range of operation.

It is to be understood that the preceding description of specific examples of this invention is not to be considered as a limitation on its scope.

What I claim is:

1. An analog-to-digital converter comprising:
a source of signal including
a step function of an analog signal, and
a damped oscillatory waveform superimposed on said step function;
a plurality of multistage devices coupled in parallel to said source;
bias circuitry coupled to each of said devices to bias each of said devices to a different predetermined value, said devices each switching from one stable condition to another stable condition when the level of the signal applied thereto from said source exceeds said predetermined value associated therewith; and
a negative feedback circuit having its input coupled to each of said devices and its output coupled in parallel to the output of said source.

2. A converter according to claim 1, wherein
said bias circuitry establishes a two-to-one relationship between said different predetermined values, and
each of said devices couples to the input of said feedback circuit an amount of feedback signal proportional to said different predetermined values associated therewith.

3. A converter according to claim 1, wherein said multistable devices are bistable devices.

4. A converter according to claim 3, wherein said source of signal includes
a source of said step function,
a damped tuned circuit coupled to said source of said step function shock excited by step function to produce said damped oscillatory waveform, and
means coupled to said source of said step function and said tuned circuit to combine said step function and said damped oscillatory waveform in a superimposed relationship.

5. A converter according to claim 3, wherein
said bias circuitry produces said different predetermined value to establish a different binary weight for each of said devices, and
the amount of signal coupled to said input of said feedback circuit by each of said bistable devices is proportional to its associated binary weight.

6. A converter according to claim 5, wherein said source of signal includes
a source of said step function,
a damped tuned circuit coupled to said source of said step function shock excited by said step function to produce said damped oscillatory waveform, and
means coupled to said source of said step function and said tuned circuit to combine said step function and said damped oscillatory waveform in a superimposed relationship.

7. A converter according to claim 1, wherein said multistable devices are tunnel diodes.

8. A converter according to claim 7, wherein said source of signal includes
a source of said step function,
a damped tuned circuit coupled to said source of said step function shock excited by said step function to produce said damped oscillatory waveform, and
means coupled to said source of said step function and said tuned circuit to combine said step function and said damped oscillatory waveform in a superimposed relationship.

9. A converter according to claim 7, wherein
said bias circuitry produces said different predetermined value to establish a different binary weight for each of said devices, and
the amount of signal coupled to said input of said feedback circuit by each of said bistable devices is proportional to its associated binary weight.

10. A converter according to claim 9, wherein said source of signal includes
a source of said step function,
a damped tuned circuit coupled to said source of said step function shock excited by said step function to produce said damped oscillatory waveform, and
means coupled to said source of said step function and said tuned circuit to combine said step function and said damped oscillatory waveform in a superimposed relationship.

References Cited

UNITED STATES PATENTS

| | | | |
|---|---|---|---|
| 3,087,150 | 4/1963 | James | 340—347 |
| 3,206,741 | 9/1965 | Kreyer | 340—347 |
| 3,320,605 | 5/1967 | Reeves | 340—347 |

MAYNARD R. WILBUR, Primary Examiner

CHARLES D. MILLER, Assistant Examiner